United States Patent Office 2,855,271
Patented Oct. 7, 1958

2,855,271

SEPARATION OF URANIUM HEXAFLUORIDE FROM ORGANIC FLUORO COMPOUNDS

Willard F. Libby, Leonia, N. J., assignor to the United States of America as represented by the United States Atomic Energy Commission No Drawing. Application June 1, 1945
Serial No. 597,155

4 Claims. (Cl. 23—14.5)

This invention relates to a process of separating organic fluorine compounds that occur as contaminants, from metallic fluorides and particularly relates to a process of removing contaminants such as $C_7F_{16}$ from $UF_6$ called uranium hexafluoride. Inasmuch as the separation of $C_7F_{16}$ from $UF_6$ is very difficult and quite important, the invention will be described in relation to that separation but it is to be understood that that particular description is for illustrative purposes only and does not constitute a limitation within the natural scope of the invention.

Uranium hexafluoride is a substance having scientific importance and, to some extent, practical utility, but in the process wherein it is used it is highly important that it be employed in a substantially uncontaminated state. It so happens, however, that the process by which it is produced, even though most skillfully manipulated, tends to leave in this compound a small percentage, normally 6 or 7%, of contaminating substances of which $C_7F_{16}$ is present in the greatest amount.

The normal processes of separating mixed compounds involve selective precipitation, selective crystallization, fractional distillation, or the use of the centrifuge. These various methods of separation are not equally useful in all cases, some being better adapted to certain separations than others, but each has its own field of high utility and the majority of mixtures yield to separation by one or another of them. However, the properties of the contaminants that accompany $UF_6$ are such that none of the ordinary methods of separation, neither those which have hereinbefore been specifically listed, nor those that have not been mentioned, are capable of satisfactorily separating these contaminants from the $UF_6$. Such separations, even though carmried out with the most extreme care, tended to leave harmful quantities of the contaminants in admixture with the $UF_6$.

It is an object of this invention to separate organic fluorine compounds from metallic fluorides, and particularly to separate $C_7F_{16}$ from $UF_6$, so that the metallic fluorides will be obtained in a substantially pure state. Another object of the invention is to separate such materials without producing an undesirable change, chemical or physical, in the metallic fluoride. A further object of the invention is to accomplish such separations by a process that is technically and economically satisfactory and adaptable to large-scale employment. Other objects of the invention will be in part apparent and in part set forth as the description proceeds.

The objects of the invention are accomplished, generally speaking, by pyrolysis.

In carrying out this new process of separation the mixture of compounds that can be separated only with difficulty, and which comprises a thermally stable metallic fluoride and an organic fluorine compound, is subjected within a vessel composed of inert material to a temperature so elevated that the organic fluorine compounds are transformed to compounds which can be separated from the metallic fluoride by ordinary methods of separation.

This pyrolysis may frequently be carried out at ordinary pressures and at temperatures circa 600° C., but it is to be understood that the guiding principle is that the temperature selected shall be sufficiently high to disintegrate, change, synthesize, or crack the organic fluorine compound into different compounds or elements without similarly affecting or changing more than an equivalent quantity of the metallic fluoride. Generally speaking, it is possible to carry out this process successfully and to accomplish the desired objective in all such circumstances and, with a minimum of experimental work, to determine the most favorable temperatures and pressures of reaction.

In general, ordinary atmospheric pressures are used but they may be either reduced or increased when favorable results are obtained by such variation.

The reaction should preferably be carried out in a material capable of withstanding the temperatures employed and which is inert at all the temperatures employed to the components of the mixture and to the products of pyrolysis. Calcium fluoride makes a satisfactory material for the particular process involving $UF_6$ and $C_7F_{16}$. The reaction may be carried out in the presence of inert gases such as helium and nitrogen if advantage is gained thereby.

The process may be carried out by the continuous method, for instance by flowing the mixture through a calcium fluoride tube heated to the pyrolytic temperature, or it may be carried out within a closed vessel, batchwise, in accordance with the circumstances controlling a particular project.

After the pyrolysis of the contaminants has been completed, the gaseous mixture from the pyrolytic chamber is subjected to refrigeration at pressures producing a solid phase, and the solidified products are subjected to separation by evacuation. For example, in the case of $UF_6$ and $C_7F_{16}$, a temperature of about $-70°$ C. has been found to be particularly useful for separating the products of the pyrolysis. Very high separation efficiency is obtained compared with the known processes of the prior art.

If reaction products are formed, during the pyrolysis, from the principal ingredient of the mixture, or from its reaction with other ingredients, they may also be separated by this means.

An advantage of the invention is in the production of uranium hexafluoride in a state of improved purity, and in a process of treating the mixed gases containing $UF_6$ which enables their separation to be carried out by ordinary means. Another advantage of the invention is in the technical simplicity and feasibility of the process, which is adapted to mass production at reasonable cost.

Since many embodiments might be made of the present invention and since many changes might be made in the embodiment described, it is to be understood that the foregoing description is to be interpreted as illustrative only and not in a limiting sense.

I claim:

1. The method of removing from $UF_6$ perfluoro organic compounds having properties that make them hard to separate by ordinary methods which comprises the steps of heating the mixture containing the $UF_6$ and the perfluoro compounds in an inert container to a temperature, and at a pressure, at which the perfluoro compounds are pyrolyzed, but at which the $UF_6$ is thermally stable, whereby compounds are produced from the perfluoro compounds that can be separated from $UF_6$ by ordinary methods of separation.

2. The method according to claim 1 in which the temperature employed is about 600° C.

3. The method according to claim 1 in which the perfluoro compounds comprise $C_7F_{16}$ and the temperature employed is about 600° C.

4. The method of separating $UF_6$ from perfluoro organic compounds containing $C_7F_{16}$ that comprises the steps of heating the mixture containing $UF_6$ and the perfluoro compounds to a temperature of about 600° C., to pyrolyze said compounds, solidifying the pyrolysis products at about −70° C. and subjecting them to evacuation to remove the gaseous pyrolysis products.

References Cited in the file of this patent (Chem. Abstracts, vol. 26, 1932 pp. 2113–4), A. von Grosse, Z. Anorg. Allgem. Chem. 204, 1932, pp. 184–6. (Translation in Div. 59.)

(Chem. Abstracts, vol. 24, 1930, p. 5741), Z. Anorg. Allgem. Chem. 192, 1930, pp. 249–56, Otto Ruff et al.

Mellor: "Comprehensive Treatise on Inorganic and Theoretical Chemistry," 1932, vol. 12, pp. 75, 76.

Thorpe's Dictionary of Applied Chemistry 4th ed. by Thorpe et al., vol. II, 1938, p. 323.